United States Patent Office 3,214,492
Patented Oct. 26, 1965

3,214,492
ORGANIC POLYMERIC ARTICLES AND PREPARATION THEREOF FROM DERIVATIVES OF ETHYLENE AND UNSATURATED BENZOPHENONES
Stanley Tocker, Wilmington, Del., assignor to E. I. du Pont de Nemours and Company, Wilmington, Del., a corporation of Delaware
No Drawing. Filed Mar. 27, 1962, Ser. No. 182,928
18 Claims. (Cl. 260—878)

This application is a continuation-in-part of my copending application Serial No. 76,101, which was filed December 16, 1960, now abandoned.

This invention relates to organic polymeric structures and, particularly, to polyethylene shaped articles such as self-supporting polyethylene films.

Shaped articles of polyethylene, because they have many outstanding physical properties and because they are comparatively inexpensive to manufacture, are ideally suited for a variety of industrial uses. However, there are some disadvantages in these articles, particularly the self-supporting films used in packaging, which tend to limit their utilization. Their limpness, their low resistance to grease and oil and their high temperature properties are all disadvantages of these materials.

Attempts have been made to improve these properties. One of these attempts involves crosslinking the polymer in the form of a shaped article utilizing such methods as reaction with peroxides, treatment with ultraviolet light plus a sensitizer or bombardment with electrons. In every case, harsh reaction conditions are necessarily employed. These harsh reaction conditions result in undesirable side reactions. The polymeric product suffers degradation in the form of oxidation or in the form of cleavage of the polymer chain. The suggestion that polar additives be added directly into the ethylene polymer before crosslinking has not solved the problem. The compatibility of these additives with the polymer and the difficulty of obtaining a uniform dispersion of these additives with the polymer have yielded non-uniform crosslinking. Occasionally, these additives contribute to premature crosslinking during the formation of the shaped article and, thus, prevent uniform crosslinking subsequently.

It is an object of this invention, therefore, to provide products of ethylene polymers, particularly polyethylene products, which can be processed into shaped articles without premature crosslinking but which can be subsequently crosslinked under relatively mild, controlled conditions so that the above-mentioned difficulties are not encountered. Another object is to provide crosslinkable polymers of ethylene that are capable of being formed into useful articles such as self-supporting films and also capable of being coated or laminated to other dissimilar materials. Other objects will appear hereinafter.

The objects are accomplished by utilizing for crosslinking a copolymer of ethylene with at least 0.01 mole percent, preferably 0.1–10 mole percent of at least one unsaturated compound having the structural formula:

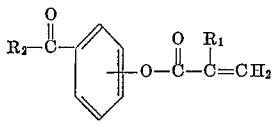

wherein $R_1$ is selected from the group consisting of hydrogen and methyl, and
$R_2$ is selected from the group consisting of methyl and phenyl.

Specifically, the process involves adding at least 0.01 mole percent, preferably 0.1–10 mole percent, of at least one ethylenically unsaturated compound selected from the group consisting of 4-methacryloxybenzophenone, 3-methacryloxybenzophenone, 2 - acryloxybenzophenone, 4-acryloxybenzophenone, 2-methacryloxyacetophenone, 2-acryloxyacetophenone and 4-acryloxyacetophenone to ethylene; copolymerizing the monomers; shaping the copolymer into a useful article, particularly a self-supporting film; and, thereafter, exposing the resulting polymeric article to radiation having a wavelength of 2,000–7,000 A., preferably ultraviolet radiation of 2,000–4,000 A., for a period of time sufficient to produce crosslinking, such period being at least 0.1 second under high energy xenon radiation but usually from 5 seconds to about 30 minutes under conventional radiation means, e.g. sunlamps, sunlight and the like.

It has also been discovered that the copolymer, preferably to the form of a shaped article, e.g. film, filament, tube, rod, etc., serves very successfully as a base or substrate for grafting polar vinylidene monomers thereon. In this manner, such properties as stiffness, moisture and oil resistance, flame resistance and the like can be imparted to the predominantly ethylenic copolymer base. The grafting process is substantially the same as that given above for crosslinking except that the exposure to radiation is carried out in the presence of a polar vinylidene monomer which has the formula:

wherein $R_3$ is selected from one of the following groups:

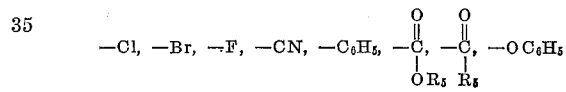

and

wherein $R_5$ and $R_6$ are each selected from the group consisting of alkyl and —H;
and wherein $R_4$ is selected from the group consisting of $R_3$, —H and alkyl of 1–4 carbon atoms.

The preferred polar vinylidene monomers for grafting are vinyl acetate, vinyl chloride, methyl acrylate, acrylonitrile, vinylidene chloride and acrylamide. However, these monomers may be selected from quite a large group, as follows: vinylidene chloride, vinylidene fluoride, methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943.

The amount of graftable monomer may be a very small amount to as high as 50 weight percent of the mixture or higher. In generic terms, the copolymer formed in the first step of the process may be subjected to radiation in the presence of from 0 to 50 weight percent of a graftable monomer and either crosslinking (when 0 weight percent of the monomer is present), grafting or both will occur.

It should be understood that the copolymers of the invention can be used as such to form shaped articles or they may be used in blends with other polymers, preferably polymers of alpha-olefins such as polyethylene and polypropylene. The blends must contain at least 0.1 percent by weight based on the weight of the blend, preferably 5–50 percent of the copolymer, and the substituted benzophenone units must represent at least 0.01 mole percent, preferably 0.1–10 mole percent of the blend. The blends, after being formed into shaped articles, can then be exposed to radiation of the type described previously to provide crosslinking sufficient to produce a noticeable improvement in the properties of the shaped article. Blending of the copolymers of the invention with other polymers may be accomplished by any of the conventional methods, e.g. rubber milling, agitating in a liquid medium, etc.

The polymeric shaped articles, such as self-supporting films, supported films (laminates and coatings), filaments, tubing, etc., can be formed from the copolymers and blends of the invention using standard procedures. These procedures may involve temperatures as high as 300° C. or more. The thermal stability of the ethylene units in the copolymer is not substantially affected by the presence of the thermally stable, bonded, substituted benzophenone groups. This contrasts with using peroxides or azo additives for heat-induced crosslinking. The use of these free radical-generating additives tends to cause premature crosslinking during processing at very high temperatures, thereby restricting their use to high flow resins, short heating periods and molding temperatures below 175° C.

It is also important to note that the copolymers in the form of relatively large shaped articles can be crosslinked by the procedure of the present invention. Since high energy radiation which involves a narrow beam of radiation is not necessary in this process, the large articles can merely be left exposed to sunlight for crosslinking. Instead of degrading the articles, the sunlight will cause crosslinking of the copolymer in the article which, in turn, will strengthen the article.

Besides exhibiting increased strength, the shaped articles of the invention display increased modulus (stiffness), improved resistance to grease and oil, increased resistance to stress-cracking and an improvement in their high temperature properties. The shaped articles, particularly the self-supporting films, find utility in packaging applications where high oil and grease resistance is required, i.e. containers for potato chips, bacon rind, etc. The shaped articles of the invention are also useful in industrial construction; for example, as protective sheeting that is resistant to "creep." Sheets containing the copolymers that had been exposed to radiation are also useful in photoreproduction processes.

It will be recognized that the self-supporting films of this invention may be treated to improve their properties by known methods prior to or subsequent to the radiation step. Thus, the films may be elongated in one or two directions, heat-set, etc., prior to or subsequent to radiation. Specifically, by first exposing the film of the copolymer or blend to radiation, then heating the film to a temperature that permits stretching but not above 100° C., then stretching the radiated heated film, preferably at least 1.5× in one or two directions, and then rapidly cooling, e.g. by blowing cool air at about 20° C. over the film, while preventing any substantial shrinkage of the film, a heat-shrinkable film (shrinkable in boiling water) suitable for meat wrapping and the like can be produced. A dimensionally stable, oriented film for packaging or for use as a magnetic tape base may be produced by heating the film of the copolymer or blend to a temperature that permits stretching but not above 100° C., stretching the heated film preferably at least 1.5× in one or two directions, rapidly cooling the stretched film while restricting dimensional change as in the previously-described process and then exposing the film to radiation in the manner previously described. It has been found that the dimensionally stable, oriented, crosslinked film can also be produced by exposing the copolymer film or a film of the blend containing the copolymer to radiation and then stretching the film at a temperature above 100° C., preferably above 120° C., in at least one direction and preferably at least 1.5×.

The process for preparing the copolymer involves subjecting the monomers, preferably in a solvent such as hexane, benzene, toluene, tetrachloroethylene, to a temperature of −40° to 300° C. and a pressure of 1–3000 atmospheres in the presence of a catalyst for a contact time sufficient to form the copolymer, usually at least 20 seconds for a continuous process and at least 3 minutes for a batch process, and then isolating the resulting copolymer.

When high pressures are used, 800 atmospheres and above, a conventional peroxide (di-tertiary-butyl peroxide) or azo catalyst (alpha,alpha′-azobisdicyclohexanecarbonitrile) may be used and the temperature is preferably 25°–175° C.

It is believed that the essential feature of this type of catalyst, or more properly termed "initiator," is that it is capable of generating free radicals. These free radical initiators, whether they be generated from a peroxide compound or from an azo-type compound combine with a polymerizable monomer to form a new free radical; the new free radical combines with another monomer molecule to form still another free radical; this process is repeated until there is propagated a long polymer chain, as is well known in the art. Polymer chain growth terminates when the free radical-bearing polymer fragment encounters another free radical which, for example, may be another growing polymer chain or an initiator free radical.

Typical peroxides which release free radicals to function as initiators include benzoyl peroxide, di-tertiary-butyl peroxide, tertiary-butyl peracetate, di-tertiary-butyl peroxydicarbonate, 2,2 - bis(tertiarybutylperoxy) butane, dimethyl dioxide, diethyl dioxide, dipropyl dioxide, propyl ether dioxide and propyl methyl dioxide. Organic hydroperoxides also applicable are, for example, tertiary-butyl-hydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha, alpha′-azobisdicyclohexanecarbonitrile, alpha,alpha′-azobisisobutyronitrile, triphenylmethylazobenzene, 1,1′-azodicycloheptanecarbonitrile, alpha,alpha′ - azobisisobutyramide, lithium azodisulfonates, magnesium azodisulfonate, dimethyl alpha,alpha′-azodiisobutyrate, alpha,alpha′-azobis(alpha,gamma-dimethylvaleronitrile) and alpha,alpha′-azobis(alpha,beta-dimethylbutyronitrile).

"Coordination" catalysts, as defined in U.S. Patent 2,822,357, may also be used to effect copolymerization. Specifically, such "coordination" catalysts are composed of:

(A) A compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O-hydrocarbon; and (B) A reducing compound selected from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeleeff's Periodic Table of the Elements, 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra-(chloroethyl)-zirconate, and the like. Specific examples of compound (B) in this definition are phenyl magnesium bromide, lithium aluminum tetraalkyl, aluminum trialkyl, dimethyl cadmium, diphenyl tin, and the like.

Copolymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. The preferred solvents are the nonpolar and aromatic solvents, e.g. benzene, hexane, cyclohexane, dioxane, etc. In some instances, copolymerization may be effected without a solvent or in an emulsion or slurry system.

The ratio of the substituted benzophenone to ethylene monomer reacted therewith should be such that the final copolymer is composed of .01–10 mole percent, preferably .1–10 mole percent, of units of the benzophenone derivative, the remainder being ethylene units. Less than .01 percent of the stabilizer does not permit sufficient crosslinking in the subsequent step involving exposure to the described radiation. More than about 10 percent does not provide sufficient improvement to warrant the expense. It has been found that the reaction is very efficient so that a reaction mixture of about .01–10 mole percent of the substituted benzophenone and about 99.99–90 mole percent of ethylene usually will provide the desired polymer product.

The polymer product, in its preferred form, is a substantially linear polymer having an inherent viscosity of at least 0.3 and having the formula:

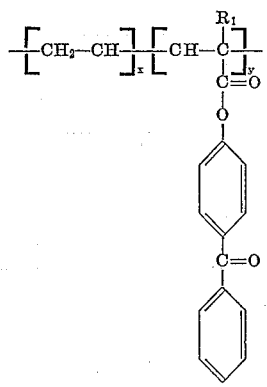

wherein $x$ and $y$ are integers and $x$ may vary from $9y$ to $999y$.

The determination of the structure is accomplished by Infrared Spectral Techniques [1] known to those skilled in ---
[1] W. M. D. Bryant and R. C. Voter, Journal of American Chemical Society, 75, 6113 (1953). F. W. Billmeyer, "Textbook of Polymer Chemistry," chapter 7, Interscience Publishers, 1957.

the art. The majority of the infrared spectra herein were taken on pressed films by the use of a Perkin-Elmer Model 21 Spectrophotometer and a Perkin-Elmer Infracord Spectrophotometer.

After copolymerization, the polymeric composition (pure copolymer or blend) is shaped into a useful article such as a film. Thereafter, the film is subjected to the action of light having a wave length range of 2,000–7,000 A. for a period of time sufficient to effect crosslinking of the copolymer.

The invention will be more clearly understood by referring to the examples which follow, Example 1 representing the best mode contemplated for carrying out the invention. In the examples, values for inherent viscosity, tensile strength, modulus, elongation and impact strength are presented.

*Inherent viscosity*, which is directly related to the molecular weight of the polymer, is defined by L. H. Cragg in J. Colloid Science, I, pp. 261–269 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer/100 ml. of solution.

The inherent viscosity of the copolymer of the invention should be at least 0.3.

*Tensile strength* is measured on an Instron Tensile Testing Machine (Model TT–B, Instron Engineering Co., Quincy, Mass.). This machine produces a load elongation chart from which may be calculated the tensile strength (tenacity or breaking strength), the modulus (elastic modulus or stiffness) and elongation (maximum elongation). The tensile strength and modulus are expressed in terms of force per area based on the cross-sectional area of the film.

*Impact strength* is the energy required to rupture a film. It is reported in kilograms-centimeters per mil thickness of the sample. The impact strength is determined by measuring the velocity of a ball mechanically accelerated by air pressure, first in free flight and then in a flight impeded by rupturing the test sample. In this test the film sample is 1¾" x 1¾", the projectiles are steel balls ½" in diameter and weighing 8.3 grams. The free flight velocity is 23 meters per second. The velocities are measured by timing photoelectrically the passage of the steel balls between two light beams set a specified distance apart. The impact strength is measured by the loss in kinetic energy due to the rupturing of the test sample. It is calculated from the following formula:

Constant $X$ (square of velocity in free flight
  —square of velocity in impeded flight)

where the constant is directly proportional to the weight of the projectile and inversely proportional to the acceleration due to gravity.

This test is carried out at 23° C. and 50% relative humidity after conditioning the samples for 24 hours at these same conditions.

EXAMPLE 1

To a dispersion of 20 grams (0.10 mole) p-hydroxybenzophenone and 50 milliliters of water, was added 4.4 grams (0.11 mole) sodium hydroxide. The mixture was stirred until a single phase resulted, and 11.5 grams of methacrylyl chloride was added dropwise with stirring. Stirring was continued for 0.5 hours and an oil phase resulted. The oil phase was dissolved in ether and extracted with 3% aqueous sodium hydroxide in order to remove unreacted phenol.

After drying the solution over anhydrous sodium sulfate, ether was stripped, and the resulting oil was dissolved in 50 milliliters of ethanol. Crystallization occurred after the mixture stood overnight at 10° C. The crude product was a white solid. Upon recrystallization from ethanol, 18.6 grams of white crystals were obtained. The melting point of the crystals was 63° C. The chemical analysis was: Carbon, 75.86%; hydrogen, 5.01%. (Calculated for $C_{17}H_{14}O_3$: Carbon, 76.67%; hydrogen, 5.34%.) The product was 4-methacryloxybenzophenone.

A solution of 0.1 gram axodicyclohexanecarbonitrile and 0.5 gram of 4-methacryloxybenzophenone in 112 milliliters of benzene was pressured with sufficient ethylene to give an autogenous pressure of 13,000 p.s.i. at 115° C. The vessel was heated at 115°–120° C. with constant repressuring of ethylene to maintain the pressure above 12,000 p.s.i until 20 grams of ethylene was absorbed. The product was washed with copious amounts of methanol in an Osterizer.

A clear 2–4 mil thick film was prepared by pressing a one-square inch sample at 100° C. under 20 tons pressure. Infrared analysis on the pressed film showed the presence of 0.25 mole percent of methacrylic ester units in the polymer. The product showed a melt index of 2.0 and an inherent viscosity of 0.76. Reprecipitation from toluene showed no composition change, indicating that copolymerization had occurred.

Using a 1,000 watt General Electric AH–6 lamp at a distance of 3¼ inches, a sample of the copolymer film showed crosslinking (insolubility in alphachloronaphthalene) in less than 18 seconds. Another sample was exposed to sunlight for about 20 minutes. Insolubility in alphachloronaphthalene indicated that crosslinking had occurred. Similarly, a sample exposed for 20 minutes to sunlight but covered by a filter to bar ultraviolet radiation (4000 A. and up) indicated appreciable crosslinking. In all cases when the photosensitizer was exhausted, the rapid crosslinking ceased, thereby affording control over the maximum degree of crosslinking. Infrared analysis of the products indicated that oxidation and chain cleavage did not occur. The final copolymer films were self-supporting at 250°. C.

EXAMPLE 2

To a dispersion of 20 grams (0.10 mole) p-hydroxybenzophenone and 50 milliliters of water was added 4.4 grams (0.11 mole) sodium hydroxide. The mixture was stirred until a single phase resulted, and 10 grams (0.11 mole) acrylyl chloride was added dropwise with stirring. Stirring was continued for 0.5 hour and an oil phase resulted. The oil phase was dissolved in ether and extracted with 3% aqueous sodium hydroxide in order to remove unreacted phenol.

After drying the solution over anhydrous sodium sulfate, ether was stripped and the resulting oil was dissolved in 50 milliliters of ethanol. Crystallization occurred after the mixture stood overnight at 10° C. Upon recrystallization from ethanol, 19.7 grams of the material were obtained. The melting point was 43° C. The chemical analysis was: Carbon, 75.69%; hydrogen, 4.94%. (Calculated for $C_{16}H_{12}O_3$: Carbon, 76.18%; hydrogen, 4.80%.) The product was 4-acryloxybenzophenone.

A solution of 0.1 gram azodicyclohexanecarbonitrile and 0.5 gram of a 4-acryloxybenzophenone in 112 milliliters of benzene was pressured with sufficient ethylene to give an autogenous pressure of 13,000 p.s.i. at 115° C. The vessel was heated to a temperature of 115°–120° C. with constant repressuring of ethylene to maintain the pressure at about 12,000 p.s.i. until approximately 20 grams of ethylene was absorbed. The product was washed with copious amounts of methanol in an Osterizer.

A clear, colorless 2–4 mil thick film was prepared by pressing a one-square inch sample at 100° C. under 20 tons pressure. Infrared analysis on the pressed film showed the presence of 0.25 mole percent of acrylic ester units in the polymer. The product had a melt index of 2.1 and an inherent viscosity of 0.77. Reprecipitation from toluene showed no composition change, indicating that copolymerization had occurred.

Using a 1,000 watt General Electric AH–6 lamp at a distance of 3¼ inches, the copolymer film showed crosslinking (insolubility in alpha-chloronaphthalene) in less than 18 seconds. Infrared analysis of the products indicated that oxidation and chain cleavage did not occur. The final copolymer films were self-supporting at 250° C.

Polyethylene, to serve as a control, was prepared from ethylene by homopolymerization under conditions substantially identical to those described for the preparation of the copolymers in Examples 1 and 2. A clear, colorless 2–4 mil thick film was prepared by pressing a one-square inch sample at 100° C. under 20 tons pressure. The product had a melt index of 3.5 and an inherent viscosity of 0.74.

The polyethylene control films were exposed to ultraviolet radiation using a 1,000 watt General Electric AH–6 lamp at a distance of 3¼ inches. After 20 seconds, the polyethylene films were still soluble in alpha-chloronaphthalene. This indicated that crosslinking, if it were taking place, was proceeding at a much slower rate than in the case of the copolymers of Examples 1 and 2. The polyethylene control films were not self-supporting above 135° C.

EXAMPLES 3 AND 4

Films were prepared as in Examples 1 and 2 from polyethylene (Example P*), ethylene/0.25 mole percent 4-methacryloxybenzophenone copolymer (Example 3) and ethylene/0.25 mole percent 4-acryloxybenzophenone copolymer (Example 4). These films were subjected to radiation from a 1,000 watt lamp as in Examples 1 and 2 for 20 minutes. The films were then tested and the properties of the films, before and after radiation are presented in Table I.

*Table I*

| Ex. | Radiation Exposure (minutes) | Thickness (mils) | Modulus (p.s.i.) | Tensile Strength (p.s.i.) | Elongation (percent) | Impact Strength (kg.cm./mil) | Inherent Viscosity |
| --- | --- | --- | --- | --- | --- | --- | --- |
| 3 | 20 | 2.6 | 43,200 | 1,600 | 38 | 2.2 | Insoluble |
| 3A* | 0 | 2.5 | 20,300 | 1,200 | 152 | 1.0 | 0.71 |
| 4 | 20 | 3.6 | 41,300 | 1,600 | 34 | 2.4 | Insoluble |
| 4A* | 0 | 2.3 | 16,700 | 1,000 | 108 | 1.4 | 0.77 |
| P* | 20 | 1.9 | 26,900 | 1,300 | 157 | 1.6 | 0.83 |
| PA* | 0 | 3.5 | 23,900 | 1,500 | 264 | 1.6 | 1.12 |

*Controls.

EXAMPLES 5–7

Films, each 2–3 mils thick, were prepared as in Examples 1 and 2 from polyethylene (Example P*), ethylene/0.25 mole percent 4-acryloxybenzophenone copolymer (Examples 5 and 6) and ethylene/0.25 mole percent 4-methacryloxybenzophenone copolymer (Example 7). The films wer subjected to radiation from 1,000 watt lamps as in Examples 1 and 2 for 3 minutes and in the ---
* Controls.

case of the ethylene/4-acryloxybenzophenone for 3 and 20 minutes.

The resulting films were tested for oil permeability by weighing them; dipping them in 20-weight motor oil at room temperature for a stated period of time (6 hours or 4 days); removing them; and reweighing them. The increase in weight is due to the absorption of oil within the pores of the film; the larger the absorption, the greater the oil permeability. The results of these tests are summarized in the following table, Table II.

*Table II*

| Example | Radiation Exposure (minutes) | Percent Weight Gain after 6 hours | Percent Weight Gain after 4 days |
|---|---|---|---|
| 5 | 20 | 0.8 | 1.4 |
| 6 | 3 | 3 | 4 |
| 5-6A* | 0 | 5 | 7 |
| 7 | 3 | 2 | 4 |
| 7A* | 0 | 8 | 9 |
| P* | 0 | 4 | 7 |
| PA* | 3 | 4 | 7 |

* Controls.

EXAMPLE 8

The following four film samples, each 4 mils thick and measuring 1 inch by 4 inches, were prepared as in the previous examples:

No. 1 (Example 8)—An ethylene/0.25 mole percent 4-methacryloxybenzophenone copolymer film, exposed to ultraviolet radiation for 5 seconds.

No. 2 (Control 8A)—An unexposed ethylene/0.25 mole percent 4-methacryloxybenzophenone copolymer film.

No. 3 (Control P)—A polyethylene film exposed to ultraviolet radiation for 5 seconds.

No. 4 (Control PA)—An unexposed polyethylene film.

The four samples were mounted on a rack and a 50-gram weight was attached and hung from each sample. The samples were then placed in an oven maintained at a temperature of 120° C. After 0.5 hour in the oven, the samples were removed and examined. The dimensions of all the films except the film of Example 8 had elongated more than 50%. The dimensions of the photocrosslinked copolymeric film (Example 8) were substantially unchanged.

EXAMPLE 9

Sufficient ethylene/4-methacryloxybenzophenone copolymer (99.75/0.25 mole percent) prepared as described in Example 2, was dissolved in trichloroethylene at 50° C. to form a 5% solution. A polyethylene film 0.006 inch in thickness was dipped into the solution. The coated film was allowed to dry only partially at room temperature to provide a hazy dispersion coating of the copolymer particles on the base sheet. Then the particles were fused to the base sheet by heating at a temperature of 80° C. in an air oven. The resulting coated film was so light-diffusive that newspaper print could be read through it only when the film was held at a distance of ¼ inch or less from the paper. A key was placed in contact with the above coated film and the system was exposed to ultraviolet radiation (General Electric AH-6, 1,000 watt lamp) at a distance of 3 inches for a period of 5 seconds.

The unexposed (uncrosslinked) portion behind the key was removed leaving an image of a key by dipping the film in xylene, followed by rapid wiping with tissue paper. The exposed section consisting of the crosslinked copolymer coating withstood the action of the solvent and remained unchanged. An image from the exposed film above was obtained by wiping the coated surface of the film with finely divided carbon black which adhered to the relatively high tack, uncrosslinked portion and slid off the crosslinked, tack-free regions. Thus, the photosensitive coated films of the present invention not only are readily adaptable to photo reproduction processes, but lead to coated polyethylene films having reduced tack or blocking characteristics as well as increased resistance to permeation of xylene and other similar hydrocarbon solvents.

EXAMPLES 10–12

For Example 10, linear polyethylene ("Marlex 50 [1]"), 25 grams, was milled on a rubber mill at a temperature of 160° C. with 5 grams of ethylene/0.5 mole percent 4-methacryloxybenzophenone copolymer (prepared as in Example 1 except for the use of 1.0 gram 4-methacryloxybenzophenone instead of 0.5 gram). This material was pressed into clear, transparent films at 160° C. using 30 tons pressure. Similarly, for example 11, branched polyethylene ("Alathon" 10 [2]) and for Example 12 polypropylene ("Pyrofax" 8239 [3]) were milled with the copolymer at a temperature of 150° and 175° C., respectively, and pressed into films at 160° C. using 30 tons pressure. The resulting films were exposed to ultraviolet radiation as in Example 9. In the three cases, photocrosslinking took place under these relatively mild conditions without degradation to provide improved films.

EXAMPLES 13 and 14

By photocrosslinking after stretching or by stretching at temperatures over 100° C. without quenching dimensionally stable film products resulted. In Example 13, a sample of the uncrosslinked branched polyethylene blend of Example 4 was stretched 3× in each direction at 90° C. followed by 20 seconds exposure to ultraviolet light under the conditions described in Example 1. In Example 14, a sample was crosslinked first and then stretched at 125° C. 8× in each direction. In both of these examples, no change in dimensions occurred when the unrestrained films thus prepared were heated to 125° C. Uncrosslinked stretched controls deformed considerably under identical conditions.

EXAMPLE 15

The preparation of 2-methacryloxybenzophenone from 2-hydroxybenzophenone was carried out in a manner similar to that described in Example 1. Upon copolymerization with ethylene according to the procedure in Example 1, a copolymer was obtained which had 0.2 mole percent bonded 2-methacryloxybenzophenone units and an inherent viscosity of 0.59. A 4.0 mil film of this material, prepared as in Example 1, was crosslinked (became insoluble in alpha-chloronaphthalene) after 13 seconds of exposure to the radiation of the General Electric AH-6 lamp as in Example 1.

EXAMPLE 16

The preparation of 3-methacryloxybenzophenone from 3-hydroxybenzophenone was carried out in a manner similar to that described in Example 1. Upon copolymerization with ethylene according to the procedure of Example 1, a copolymer was obtained which contained 0.21 mole percent acrylic ester units and an inherent viscosity of 0.73. A 4.0 mil film of this material, prepared as in Example 1, was crosslinked after 14 seconds of exposure to radiation as in Example 1.

EXAMPLE 17

The preparation of 2-acryloxybenzophenone from 2-hydroxybenzeophenone was similar to that described in Example 1. The copolymerization with ethylene was also carried out in a manner similar to that described in Example 1. The product contained 0.23 mole percent acrylic ester units and had an inherent viscosity of 0.67. A

---

[1] Manufactured by The Phillips Chemical Co.
[2] Manufactured by E. I. du Pont de Nemours & Co.
[3] Manufactured by Hercules Powder Company.

3.8 mil film of this material, prepared as in Example 1, was crosslinked after an exposure of 20 seconds to radiation as in Example 1.

EXAMPLE 18

Twenty grams of ethylene/4-acryloxybenzophenone (96/4 mole percent) was dissolved in 200 grams of toluene in a reaction vessel and heated to 90–100° C. To this solution was added 50 ml. of n-butanol. No precipitation of the copolymer out of solution was observed.

A pool of the hot solution was doctored onto the surface of a piece of black paper (Crane & Co., carbonizing grade) taped to a glass plate. A doctor blade with 8 mils clearance was utilized. The solvent was evaporated with a blast of hot air from a portable hot air dryer leaving an opaque coating on the film surface The paper was then exposed to an ultraviolet lamp (Hanovia, 140 watt) from a distance of 12 inches for 15 minutes. During exposure, a portion of the paper was covered by a circular aluminum disc, and another portion by a cardboard label. After exposure, the paper was placed in a laboratory oven at 120° C. for 5 minutes. After heating, the unexposed shaped areas were completely coalesced and showed a shiny black surface. The surrounding exposed areas were opaque, completely unchanged in appearance.

This example illustrates the applicability of the copolymeric compositions in the preparation of photo sensitive materials used for photocopying. Optical projection of an original onto the photosensitive paper through a positive or negative transparency, which is kept in intimate contact with the paper, will produce a latent image in the opaque coating. The irradiated portions will crosslink and become infusible. Subsequent heat-treatment of the paper (e.g. passing over a heated roll) develops a visible image by thermally clarifying the fusible portions of the coating and, thereby, allowing the dyed surface of the paper to show through. Thus, the process yields an exact reproduction of the original, i.e. a positive copy from a positive original, or a negative copy from a negative original.

This photosensitive paper offers distinct advantages in photocopying of printed matter. A copy is obtained in a one-step process, whereas conventional photocopying will yield a negative copy. In addition to this, the paper might be useful in microfilm copying and in photofinishing.

The next two examples illustrate the utility of the copolymers for grafting monomers onto the predominantly polyethylene base, which monomers could only be grafted with extreme difficulty onto pure polyethylene.

EXAMPLE 19

A 2″ x 2″ film of ethylene/4-methacryloxybenzophenone copolymer (99/1 wt. ratio) weighing 0.61 gram was exposed to ultraviolet light in a quartz cell in the presence of 10 ml. acrylonitrile for 4 minutes under nitrogen. The light source was a General Electric AH-6 (1,000 watt) lamp and the distance between light source and sample was 3 inches. An air flow was directed in the vicinity of the samples during exposure to prevent overheating. The resultant film had some adhered polyacrylonitrile which was removed by scrubbing with a detergent. After drying the film, it was found to weigh 0.82 gram. Infrared analysis showed strong C—N absorption at 2200 cm.$^{-1}$, and the film was appreciably stiffer than the ungrafted copolymer control or a polyethylene film control.

A second experiment was carried out in the same manner as described above except that a 15-minute exposure time was used. The grafted film weighed 1.2 grams.

In a third experiment, the film was placed in a polyethylene bag along with 3.0 ml. of acrylonitrile. After flushing with nitrogen, the bag was sealed and exposed to ultraviolet radiation in the manner described above for 5 minutes. The grafted film weighed 1.3 grams and the polyethylene bag showed no weight increase due to acrylonitrile grafting.

It was noted that the films from the second and third experiments were unaffected by boiling toluene whereas films of polyethylene and the ungrafted copolymer are readily permeated by hot toluene.

EXAMPLE 20

An ethylene/4-acryloxybenzophenone copolymer (96:4 weight ratio) was melt pressed to a film at 125° C. A drop of a 40% acrylamide solution in water was placed on a glass plate and the film was pressed down upon the liquid until the liquid completely covered the underside of the film. A key was then placed on top of the film and the composite was exposed to a 1,000 watt General Electric AH-6 lamp (on the key side) for 20 seconds. The film was washed with water to remove unconverted acrylamide and ungrafted acrylamide. It was then dipped into writing ink (Skrip Permanent No. 34 Jet Black). The grafted acrylamide absorbed the ink leaving a colorless image of the key where the key had blocked exposure to light and prevented grafting.

EXAMPLES 21–24

To a dispersion of 20 grams (0.1 mol.) 2-hydroxyacetophenone and 30 milliliters of water, was added 6.5 grams (0.16 mol.) sodium hydroxide. The mixture was stirred until a single phase resulted, and 16.8 grams (0.16 mol.) of methacrylyl chloride was added dropwise with stirring. Stirring continued for 0.5 hour and an oil phase resulted. The resultant oil phase was dissolved in ether and extracted with water in order to remove unreacted phenol.

After drying the solution over anhydrous sodium sulfate, ether was stripped, and the resulting oil distilled. The product distilled at 110–112° C. at 0.9 mm. The yield was 18.1 grams. The specific gravity at 25° C. was 1.5293. The chemical analysis was: carbon 69.95%, hydrogen 5.79% (calculated for $C_{12}H_{12}O_3$: carbon 70.57%; hydrogen 5.92%.) The product was 2-methacryloxyacetophenone.

A solution of 0.1 gram azodicyclohexanecarbonitrile and 0.5 gram of 2-methacryloxyacetophenone in 1.2 milliliters of benzene was pressured with sufficient ethylene to give an autogenous pressure of 13,000 p.s.i. at 115° C. The vessel was heated to a temperature of 115–120° C. with constant repressuring of ethylene to maintain the pressure at about 12,000 p.s.i. until approximately 20 grams of ethylene was absorbed. The product was washed with copious amounts of methanol in an Osterizer.

A clear 4-mil thick film was prepared by pressing a one-square inch sample at 100° C. under 20 tons pressure. Infrared analysis on the pressed film showed the presence of 0.7 mole percent of methacrylic ester units in the polymer. Reprecipitation from toluene showed no composition change indicating that copolymerization had occurred.

In a similar manner to that described above the following comonomers were prepared, copolymerized with ethylene, and pressed into clear 4-mil thick films.

| Example | Comonomer | Mole Percent Comonomer |
|---|---|---|
| 22 | 2-acryloxyacetophenone | 0.7 |
| 23 | 4-acryloxyacetophenone | 0.7 |
| 24 | 4-methacryloxyacetophenone | 0.7 |

Samples of the above-prepared films were subjected to the action of ultraviolet light from a 1,000 watt General Electric AH-6 lamp at a distance of 3¾″. All of the samples showed crosslinking (insolubility in alpha-chloronaphthalene) in less than 11 seconds. Infrared analysis of the films indicated that oxidation and chain cleavage did not occur.

EXAMPLE 25

This example illustrates the applicability of the invention to ethylene polymers, in general. Thus, the photosensitizing monomer (the benzophenone or the acetophenone) can be copolymerized with ethylene along with up to 50 mole percent of a monomer copolymerizable with ethylene, e.g., a polar vinylidene monomer, another alpha-olefin, etc.

The following solution was prepared and pressured (3400 p.s.i.) with ethylene at room temperature in a 300 ml. stainless steel reactor: 112 ml. benzene, 10 g. vinyl acetate, 0.2 g. di-tert-butyl peroxide and 1.0 g. 4-methacryloxybenzophenone. The reactor was then heated to 130–135° C. with shaking, which gave an autogenous internal pressure of approximately 12,500 p.s.i. Additional ethylene was pressured into the reactor from time to time in order to keep the autogenous pressure between 12,000 and 12,500 p.s.i. When ethylene ceased to be absorbed, the reactor was cooled and opened. The polymer was washed with methanol and dried. The weight of dried polymer was 17 grams and its inherent viscosity was 0.81. Infrared analysis showed the presence of 34 mole percent vinyl acetate and 1 mole percent 4-methacryloxybenzophenone.

A control copolymerization of ethylene and vinyl acetate was carried out as described above, omitting the photosensitizing monomer. The yield was 18 grams of copolymer having an inherent viscosity of 0.88. Infrared analysis showed the presence of 34 mole percent vinyl acetate.

Both polymers were rubbery at room temperature and tacky at temperatures of 35° C. and above. Films of these systems were prepared by melt pressing 1 square inch samples at 100° and 15 tons pressure.

Upon exposing these samples to a General Electric AH–6 lamp at a distance of 3″ for 20 seconds, the 4-methacryloxybenzophenone-containing copolymer became insoluble and tack-free at 35°–50° C. On the other hand, the ethylene-vinyl acetate copolymer control was unchanged.

As mentioned hereinbefore, the unsaturated benzophenone derivatives used in this invention must be of the formula:

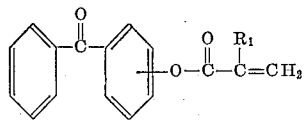

or

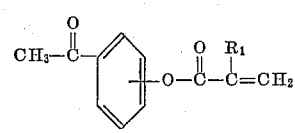

wherein $R_1$ is selected from the group consisting of hydrogen and methyl.

It will be evident to those skilled in the art that certain other groups such as alkyl, alkoxy, halogen, etc., may be attached to either of the two benzene rings of the benzophenone structure without impairing the photosensitizing function of the compound. Such di- or tri-, etc., substituted compounds are considered to be within the scope of the present invention.

It will also be evident to those skilled in the art that the films prepared from the copolymeric compositions of the present invention and blends thereof with alpha-olefins may have incorporated therein, without impairment of their operability, materials of specific functionality. Such materials include dyestuffs, fillers, pigments, plasticizers, slip agents, anti-static agents, etc. The compositions and the resulting products are also considered to be within the scope of this invention.

Having fully disclosed the invention, what is claimed is:

1. A copolymer of ethylene with 0.01–10 mole percent of at least one unsaturated compound having the structural formula:

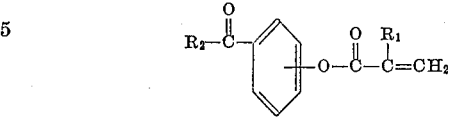

wherein $R_1$ is selected from the group consisting of hydrogen and methyl, and $R_2$ is selected from the group consisting of methyl and phenyl.

2. A copolymer of ethylene with 0.01–10 mole percent of 4-methylacryloxybenzophenone.

3. A copolymer of ethylene with 0.01–10 mole percent of 4-acryloxybenzophenone.

4. A copolymer of ethylene with 0.01–10 mole percent of 2-methacryloxybenzophenone.

5. A copolymer of ethylene with 0.01–10 mole percent of 2-acryloxybenzophenone.

6. A copolymer of ethylene with 0.01–10 mole percent of 2-methylacryloxyacetophenone.

7. A copolymer of ethylene with 0.01–10 mole percent of 2-acryloxyacetophenone.

8. A copolymer of ethylene with 0.01–10 mole percent of 4-acryloxyacetophenone.

9. A copolymer of ethylene with 0.1–10 mole percent of at least one unsaturated compound having the structural formula:

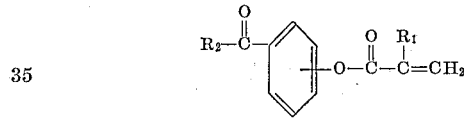

wherein $R_1$ is selected from the group consisting of hydrogen and methyl, and $R_2$ is selected from the group consisting of methyl and phenyl.

10. A composition of matter consisting essentially of a blend of a polymer of an alpha-olefin selected from the group consisting of polyethylene and polypropylene and at least 0.1 percent by weight, based on the weight of the blend, of a copolymer of ethylene with at least one substituted benzophenone having the structural formula:

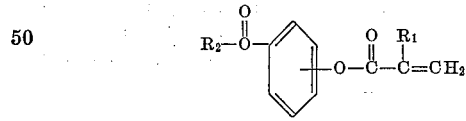

wherein $R_1$ is selected from the group consisting of hydrogen and methyl, and $R_2$ is selected from the group consisting of methyl and phenyl, the substituted benzophenone being 0.01–10 mole percent of the sum of the moles of said alpha-olefin in said polymer, said ethylene in the copolymer and the substituted benzophenone in the copolymer.

11. A composition of matter consisting essentially of a blend of a polymer of an alpha-olefin selected from the group consisting of polyethylene and polypropylene and 5–50 percent by weight, based on the weight of the blend, of a copolymer of ethylene with at least one subsituted benzophenone having the structural formula:

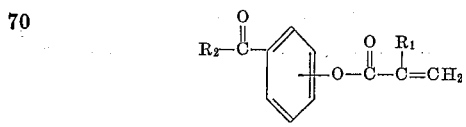

wherein $R_1$ is selected from the group consisting of hydrogen and methyl, and $R_2$ is selected from the group consisting of methyl and phenyl, the substituted benzophenone being 0.01–10 mole percent of the sum of the moles of said alpha-olefin in said polymer, said ethylene in the copolymer and the substituted benzophenone in the copolymer.

12. A self-supporting film consisting essentially of a copolymer of ethylene with 0.01–10 mole percent of at least one unsaturated compound having the structural formula:

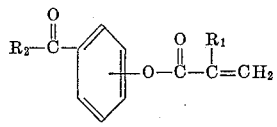

wherein $R_1$ is selected from the group consisting of hydrogen and methyl, and $R_2$ is selected from the group consisting of methyl and phenyl.

13. A self-supporting film consisting essentially of a blend of a polymer of an alpha-olefin selected from the group consisting of polyethylene and polypropylene and at least 0.1 percent by weight of a copolymer of ethylene with at least one substituted benzophenone having the structural formula:

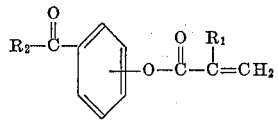

wherein $R_1$ is selected from the group consisting of hydrogen and methyl, and $R_2$ is selected from the group consisting of methyl and phenyl, the substituted benzophenone being 0.01–10 mole percent of the sum of the moles of said alpha-olefin in said polymer, said ethylene in the copolymer and the substituted benzophenone in the copolymer.

14. A shaped article consisting essentially of a crosslinked copolymer of ethylene with 0.01–10 mole percent of at least one unsaturated compound having the structural formula:

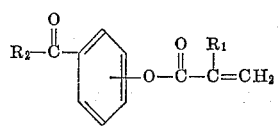

wherein $R_1$ is selected from the group consisting of hydrogen and methyl, and $R_2$ is selected from the group consisting of methyl and phenyl, said crosslinked copolymer characterized by the fact that it is insoluble in alpha-chloronaphthalene whereas the copolymer, prior to crosslinking, is soluble in alpha-chloronaphthalene.

15. A self-supporting film consisting essentially of a crosslinked copolymer of ethylene with 0.01–10 mole percent of at least one unsaturated compound having the structural formula:

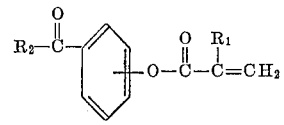

wherein $R_1$ is selected from the group consisting of hydrogen and methyl, and $R_2$ is selected from the group consisting of methyl and phenyl, said crosslinked copolymer characterized by the fact that it is insoluble in alpha-chloronaphthalene whereas the copolymer, prior to crosslinking, is soluble in alpha-chloronaphthalene.

16. A shaped article consisting essentially of a copolymer of ethylene with 0.01–10 mole percent of at least one unsaturated compound having the structural formula:

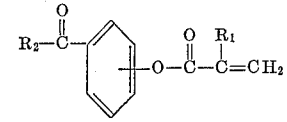

wherein $R_1$ is selected from the group consisting of hydrogen and methyl, and $R_2$ is selected from the group consisting of methyl and phenyl;

to which is grafted a polar vinylidene monomer having the formula:

wherein $R_3$ is selected from one of the following groups:

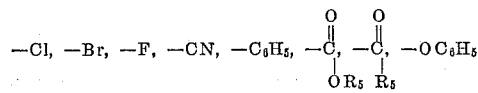

and

wherein $R_5$ and $R_6$ are each selected from the group consisting of alkyl and —H;

and wherein $R_4$ is selected from the group consisting of $R_3$, —H and alkyl of 1–4 carbon atoms.

17. A shaped article as in claim 16 wherein said polar vinylidene monomer is acrylamide.

18. A shaped article as in claim 16 wherein said polar vinylidene monomer is acrylonitrile.

References Cited by the Examiner

UNITED STATES PATENTS

| | | | |
|---|---|---|---|
| 2,345,006 | 3/44 | Ross et al. | 260—410.5 |
| 2,484,529 | 10/49 | Roedel | 204—158 |
| 2,938,883 | 5/60 | Raich | 260—63 |
| 2,999,772 | 9/61 | Burk et al. | 204—162 |
| 3,008,920 | 11/61 | Urchick | 204—163 |
| 3,134,684 | 5/64 | Northrop et al. | 204—158 |

OTHER REFERENCES

Oster et al.: Journal of Polymer Science, vol. 34, pages 671–684 (1959).

WILLIAM H. SHORT, *Primary Examiner.*

JOSEPH R. LIBERMAN, *Examiner.*